United States Patent
Fritsch (10) Patent No.: US 9,239,006 B2
(45) Date of Patent: Jan. 19, 2016

(54) GAS TURBINE ENGINE AND SYSTEM FOR MODULATING SECONDARY AIR FLOW

(75) Inventor: Theodore Joseph Fritsch, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 1039 days.

(21) Appl. No.: 13/336,352

(22) Filed: Dec. 23, 2011

(65) Prior Publication Data

US 2012/0167589 A1 Jul. 5, 2012

Related U.S. Application Data

(60) Provisional application No. 61/428,805, filed on Dec. 30, 2010.

(51) Int. Cl.
*F02C 6/08* (2006.01)
*F02C 9/18* (2006.01)
*F01D 9/06* (2006.01)
*F01D 17/14* (2006.01)
*F04D 27/02* (2006.01)

(52) U.S. Cl.
CPC ... *F02C 6/08* (2013.01); *F01D 9/06* (2013.01); *F01D 17/145* (2013.01); *F04D 27/0215* (2013.01)

(58) Field of Classification Search
CPC ............ F02C 6/08; F02C 9/18; F16K 3/0209; F16K 3/029; F16K 3/08; F04D 27/0215; F01D 9/065; F01D 11/24; F01D 25/162
USPC ........ 60/782, 785, 795; 251/59, 88, 180, 188, 251/192, 209; 415/36–41, 148, 150, 151, 415/155, 159, 167
See application file for complete search history.

(56) References Cited

U.S. PATENT DOCUMENTS

| | | | |
|---|---|---|---|
| 3,575,528 A | 4/1971 | Beam, Jr. et al. | |
| 4,217,755 A | 8/1980 | Williams | |
| 4,358,925 A * | 11/1982 | Williams | 60/785 |
| 4,856,962 A * | 8/1989 | McDow | 415/115 |
| 6,427,448 B1 | 8/2002 | Reichert | |
| 6,564,557 B1 | 5/2003 | Dailey | |
| 6,931,859 B2 | 8/2005 | Morgan et al. | |
| 7,162,876 B2 | 1/2007 | Hoff et al. | |
| 8,678,026 B2 * | 3/2014 | Rief et al. | 137/112 |
| 2002/0096215 A1* | 7/2002 | Bradley | 137/505.11 |
| 2002/0189263 A1* | 12/2002 | Rayer et al. | 60/782 |
| 2005/0109016 A1 | 5/2005 | Ullyott | |
| 2005/0172640 A1 | 8/2005 | Dreves et al. | |
| 2007/0137213 A1 | 6/2007 | Rickert et al. | |
| 2010/0083667 A1* | 4/2010 | Franconi | 60/795 |
| 2010/0150700 A1* | 6/2010 | Strecker et al. | 415/116 |

* cited by examiner

*Primary Examiner* — Ehud Gartenberg
*Assistant Examiner* — Arun Goyal
(74) *Attorney, Agent, or Firm* — Fishman Stewart Yamaguchi PLLC (57) ABSTRACT

One embodiment of the present invention is a unique gas turbine system having a system for modulating secondary air flow. Another embodiment is a compressor vane stage with a plenum employed in providing secondary air flow. Other embodiments include apparatuses, systems, devices, hardware, methods, and combinations for secondary air flow systems. Further embodiments, forms, features, aspects, benefits, and advantages of the present application shall become apparent from the description and figures provided herewith.

17 Claims, 6 Drawing Sheets

GAS TURBINE ENGINE AND SYSTEM FOR MODULATING SECONDARY AIR FLOW

CROSS REFERENCE TO RELATED APPLICATIONS

The present application claims benefit of U.S. Provisional Patent Application No. 61/428,805, filed Dec. 30, 2010, entitled Gas Turbine Engine And System For Modulating Secondary Air Flow, which is incorporated herein by reference.

FIELD OF THE INVENTION

The present invention relates to gas turbine engines, and more particularly, to modulating secondary air flow in a gas turbine engine.

BACKGROUND

Systems for controlling secondary air flow in a gas turbine engine remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine having a system for modulating secondary air flow. Another embodiment is a compressor vane stage with a plenum employed in providing secondary air flow. Other embodiments include apparatuses, systems, devices, hardware, methods, and combinations for secondary air flow systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
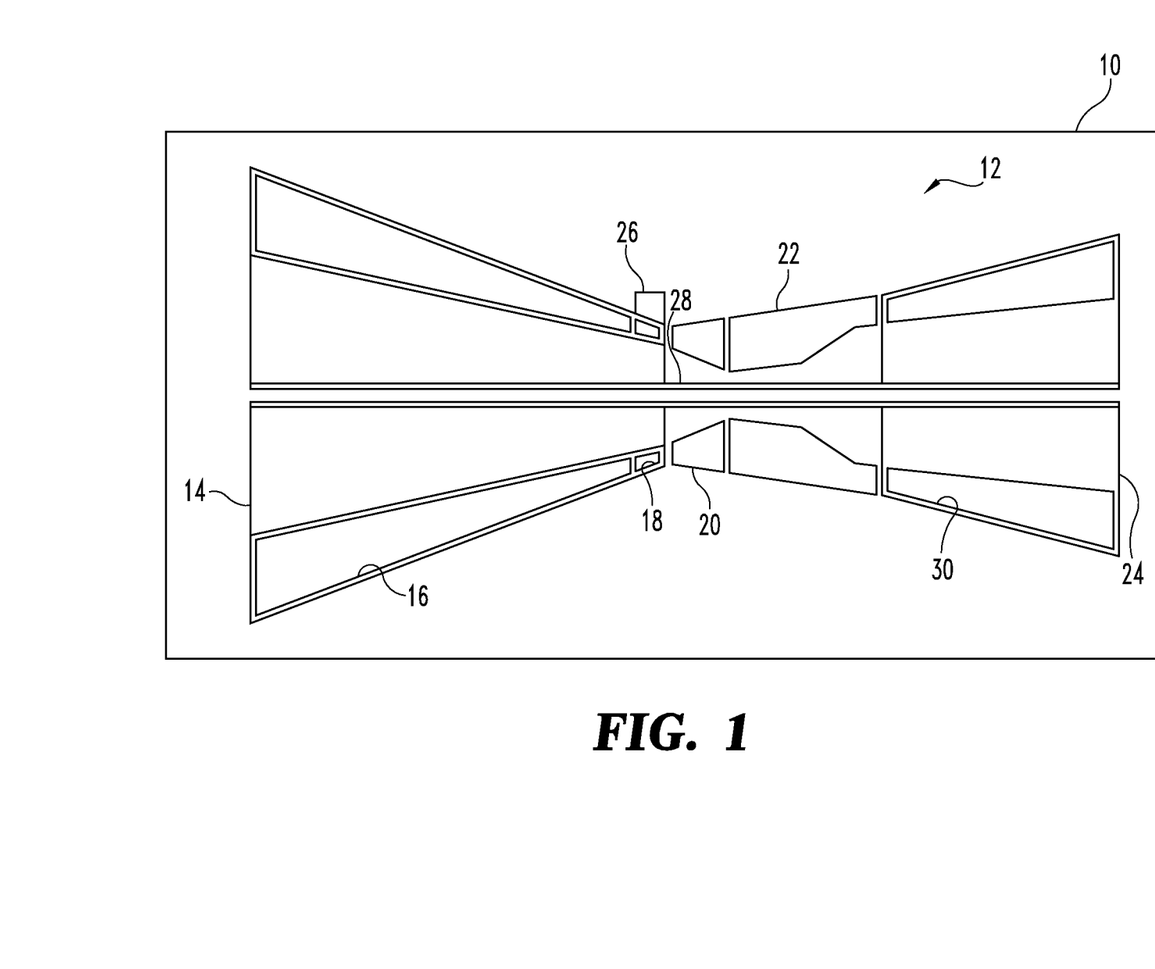
FIG. 1 schematically illustrates some aspects of a non-limiting example of a gas turbine engine in accordance with an embodiment of the present invention.

Referring to the drawings, and in particular, FIG. 1, some aspects of a non-limiting example of a gas turbine engine 10 in accordance with an embodiment of the present invention are schematically depicted. In one form, gas turbine engine 10 is an axial flow machine, e.g., an aircraft propulsion power plant. In other embodiments, gas turbine engine 10 may be a centrifugal flow machine or a combination axial centrifugal flow machine. It will be understood that the present invention is equally applicable to various gas turbine engine configurations, for example, including turbojet engines, turbofan engines, turboprop engines, turboshaft engines and combined cycle engine having axial, centrifugal and/or axi-centrifugal compressors and/or turbines.

In the illustrated embodiment, gas turbine engine 10 includes an engine core 12. Engine core 12 includes a compressor 14 having a plurality of blades and vanes 16 with outlet guide vanes (OGV) 18, a diffuser 20, a combustor 22, a turbine 24 and a system 26 for modulating secondary air flow from compressor 14, e.g., modulating the flow rate of the secondary air. Diffuser 20 and combustor 22 are fluidly disposed between OGV 18 of compressor 14 and turbine 24. Turbine 24 is drivingly coupled to compressor 14 via a shaft 28. Although only a single spool is depicted, it will be understood that the present invention is equally applicable to multi-spool engines. In various embodiments, gas turbine engine 10 may include, in addition to engine core 12, one or more fans, additional compressors and/or additional turbines.

During the operation of gas turbine engine 10, air is supplied to the inlet of compressor 14. Blades and vanes 16 compress air received at the inlet of compressor 14, and after having been compressed, the air is discharged via OGV 18 into diffuser 20. Diffuser 20 reduces the velocity of the pressurized air from compressor 14, and directs the pressurized air to combustor 22. Fuel is mixed with the air and combusted in combustor 22, and the hot gases exiting combustor 22 are directed into turbine 24.

Turbine 24 includes a plurality of blades and vanes 30. Blades and vanes 30 extract energy from the hot gases to, among other things, generate mechanical shaft power to drive compressor 14 via shaft 28. In one form, the hot gases exiting turbine 24 are directed into a nozzle (not shown), which provides thrust output the gas turbine engine. In other embodiments, additional turbine stages in one or more additional rotors upstream and/or downstream of turbine 24 may be employed, e.g., in multi-spool gas turbine engines.

Figure 2:
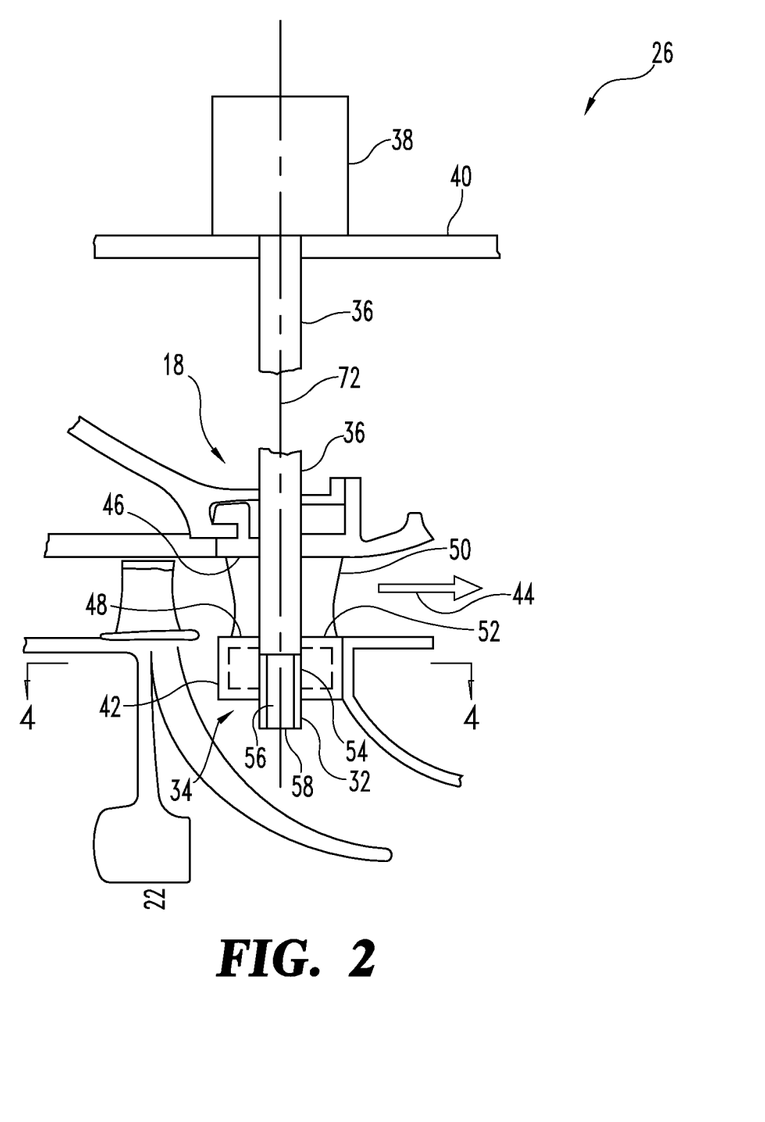
FIG. 2 schematically illustrates some aspects of a non-limiting example of a system for modulating secondary air flow in accordance with an embodiment of the present invention.
Figure 3:
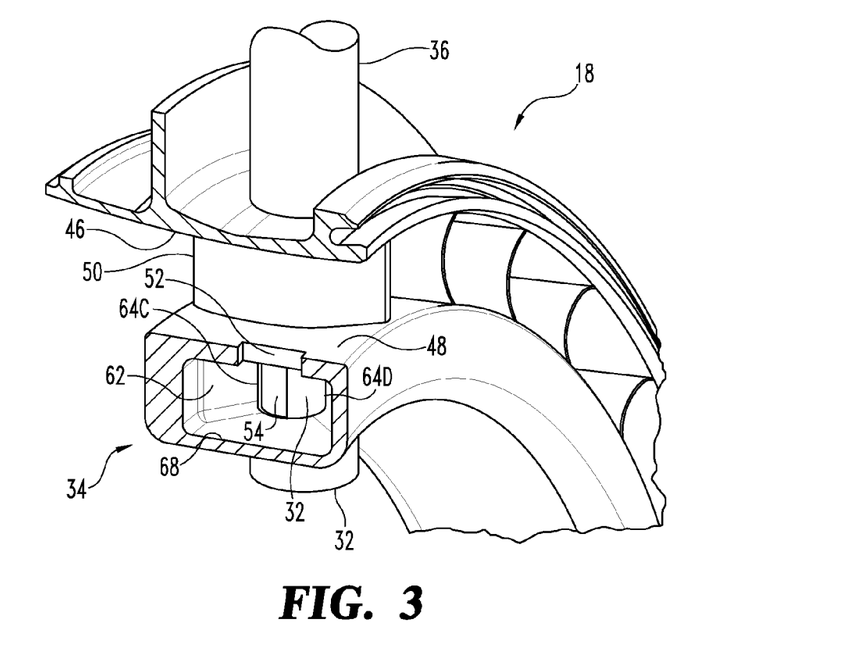
FIG. 3 is a cross section depicting some aspects of a non-limiting example of an outlet guide vane and features of the system of FIG. 2.

Referring now to FIGS. 2 and 3, a non-limiting example of system 26 for modulating secondary air flow in accordance with an embodiment of the present invention is schematically depicted. Secondary air flow is a bleed air flow extracted from the main flowpath of a gas turbine engine. In some cases, the secondary airflow may be used one or more of cooling, thrust balance control, sump venting, seal cavity purging, and other conventional uses. In one form, system 26 modulates the flow of bleed air from OGV 18. In a particular form, system 26 modulates the flow of bleed air from OGV 18 for use as cooling air that is delivered to one or more turbine blades and/or vanes of blades and vanes 30. In other embodiments, system 26 may be configured to modulate bleed air from any one or more stages of compressor 14 in addition to or in place of OGV 18 for use as cooling air and/or for other purposes, including purposes not mentioned herein.

System 26 includes a movable valve member 32, a stationary valve member 34, a valve shaft 36, and an actuator 38 mounted outside of a compressor case 40. It will be understood that in some embodiments, system 26 may include a plurality of movable valve members 32, stationary valve members 34, valve shafts 36, and/or actuators 38. In one form, movable valve member 32 and stationary valve member 34 are disposed in a distribution plenum 42. In one form, plenum 42 collects the secondary airflow for delivery through movable valve member 32 and stationary valve member 34 to turbine 24 via passages (not shown) between system 26 and turbine 24. In one form, plenum 42 is disposed inboard (inside) of the main flowpath 44, which, in one form, extends through compressor 14 (including OGV 18), diffuser 20, combustor 22 and turbine 24. In other embodiments, plenum 42 may be disposed outside of main flowpath 44.

OGV 18 includes an outer band 46, an inner band 48 and a plurality of airfoils disposed in main flowpath 44 between outer band 46 and inner band 48. Inner band 48 includes a plurality of openings 52, e.g., slots, which supply pressurized air from main flowpath 44 to plenum 42. In one form, plenum 42 is integral with inner band 48. In other embodiments plenum 42 may be separately formed and may be in fluid communication with main flowpath 44 via openings 52 and/or other means. In one form, valve shaft 36 is received in an airfoil 50 of the plurality of airfoils of OGV 18.

Movable valve member 32 includes two inlet ports 54, a passage 56 and a discharge port 58. Passage 56 is in fluid communication with ports 54 and port 58. Movable valve member 32 is operative to transmit secondary air flow through passage 56 between ports 54 and port 58. Movable valve member 32 is coupled to valve shaft 36. In one form, movable valve member 32 extends from valve shaft 36. In one form, movable valve member 32 is a part of valve shaft 36. In other embodiments, valve member 32 may be a separate component that is otherwise coupled to valve shaft 36.

Figure 4:
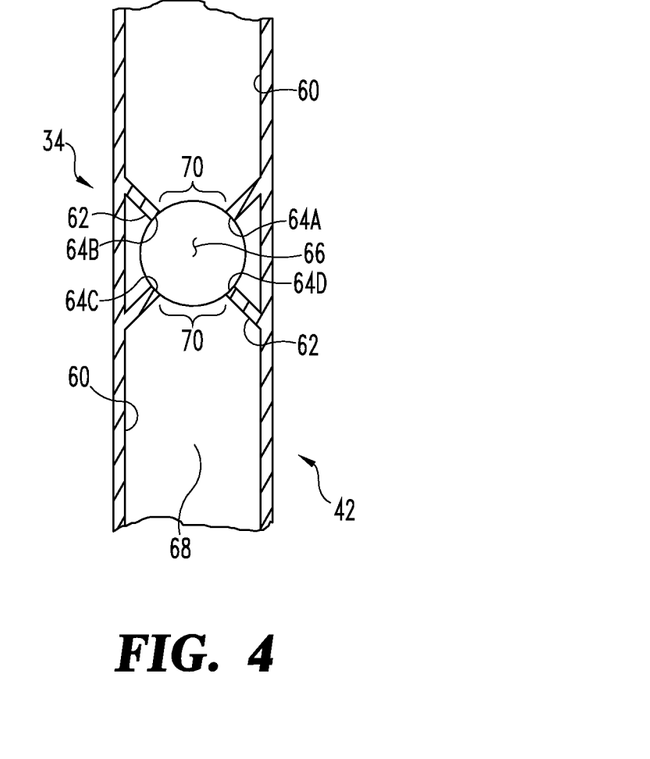
FIG. 4 is a cross section through a plenum illustrating some aspects of a non-limiting example of a stationary valve member in accordance with an embodiment of the present invention.

Referring now to FIG. 4 in conjunction with FIGS. 2 and 3, the present non-limiting example of an embodiment of the present invention is further described. FIG. 4 depicts a partial cross section through plenum 42 that illustrates walls 60. Walls 60 define the extents of plenum 42 in the engine axial direction. In the depiction of FIG. 4, movable valve member 32 is removed for purposes of clarity of illustration. In one form, stationary valve member 34 is disposed in and integral with plenum 42, although in other embodiments, stationary valve member 34 may be a separate component. In still other embodiments, stationary valve member 34 may not be disposed in or integral with plenum 42. Stationary valve member 34 is structured to interact with movable valve member 32 in order to yield a valve for modulating the flow of secondary air. In one form, stationary valve member 34 is structured receive at least partially therein movable valve member 32. In other embodiments, other mechanical arrangements and types of interface between stationary valve member 34 and movable valve member 32 than that illustrated and described herein may be employed.

Stationary valve member 34 includes a plurality of walls 62. In one form, walls 62 are integral with and adjoin walls 60. Walls 62 have ends 64A-64D, in between of which movable valve member 32 is received. Movable valve member 32 is also received into an opening 66 in a bottom wall 68 of plenum 42. In one form, two gate openings 70 are located between the ends of walls 62; one between ends 64A and 64B, and another between ends 64C and 64D. Gate openings 70 are disposed inboard of both compressor case 40 and flowpath 44. Gate openings 70 are in fluid communication with plenum 42, and hence exposed to the pressurized air in plenum 42 that is supplied to plenum 42 from main flowpath 44 via openings 52. Movable valve member 32 and stationary valve member 34 are geometrically structured such that a movement of movable valve member 32 yields an overlap of ports 54 with gate openings 70. This overlap forms a valve flow area that permits the secondary air flow to pass through gate opening 70 and ports 54 and discharge through port 58.

Valve shaft 36 extends between actuator 38 and movable valve member 32. In one form, valve shaft 36 is a single integral shaft. In other embodiments, valve shaft 36 may be formed of two or more components coupled or joined together. In one form, valve shaft 36 is oriented with its major axis 72 being perpendicular to the centerline of engine 10. In other embodiments, valve shaft 36 may extend at other angles relative to the centerline of engine 10. Valve shaft 36 is operative to transmit motion from actuator 38 to movable valve member 32. In one form, the motion is a rotation of valve shaft 36 about axis 72 relative to stationary valve member 34. In another form, the motion is a translation of valve shaft 36 along axis 72. In other embodiments, both rotation and translation may be employed. In one form, valve shaft 36 extends in one direction through an airfoil 50 of OGV 18 toward plenum 42, and extends in the other direction outside of main flowpath 44 toward compressor case 40. In a particular form, valve shaft 36 extends from outside of compressor case 40 to inside of flowpath 44. In other embodiments, valve shaft 36 may be arranged otherwise, for example and without limitation, and may extend from inside of compressor case 40 to inside of flowpath 44.

Actuator 38 is coupled to valve shaft 36. Actuator 38 is operative to impart motion to valve shaft 36 to control the size of the valve flow area in order to modulate secondary air flow. In one form, actuator 38 is a rotary actuator. In another form, actuator 38 is a linear actuator. In other embodiments, actuator 38 may provide both rotational and translational output. In one form, actuator 38 is a mechanical actuator. In another form, actuator 38 is an electrical actuator. In various embodiments, actuator 38 may operate using a pressure differential, e.g., of air, hydraulic fluid, engine lubricating oil or fuel, or may be actuated via an electric motor or via any convenient means. In one form, actuator 38 is positioned outside of compressor case 40, which allows easy access to actuator 38 and valve shaft 36 for maintenance/repair/replacement, e.g., relative to actuators located inside an engine case such as compressor case 40. In other embodiments, actuator 38 may be positioned in other locations, including inside compressor case 40.

Motion imparted by actuator 38 is transmitted through valve shaft 36 to movable valve member 32, which varies the overlap of ports 54 with gate openings 70. The overlap of ports 54 with gates openings 70 provides a valve flow area for discharging pressurized air from plenum 42. Although the present embodiment employs two ports 54 with two gate openings 70 to create the valve flow area, it will be understood that a greater or lesser number of ports and/or gates may alternatively be employed. When movable valve member 32 is positioned by actuator 38 to cause an overlap between ports 54 and gate openings 70, pressurized air in plenum 42 flows through gate openings 70 into ports 54, which is discharged from port 58 via passage 56 of movable valve member 32. When movable valve member 32 is positioned by actuator 38 to prevent an overlap between ports 54 and gate openings 70, the flow of pressurized air from plenum 42 is prevented, other than any leakage. Excessive leakage may be controlled, if desired, by the use of seals (not shown).

In one form, ports 54 and gate openings 70 are positioned on movable valve member 32 and stationary valve member 34, respectively, to provide a desired valve flow area that may be changed by a rotation of movable valve member 32, e.g., about axis 72. In other embodiments, ports 54 and gate openings 70 may be positioned to provide a desired valve flow area based on other types of motion. For example, ports 54 and gate openings 70 may be positioned on movable valve member 32 and stationary valve member 34, respectively, to provide a desired valve flow area that may be changed by a translation of movable valve member 32, e.g., along axis 72, relative to stationary valve member 34. It will be understood that the placement of ports 54 and gate openings 70, as well as other aspects of the designs of movable valve member 32 and stationary valve member 34 may take into account various parameters associated with the operation of engine 10, such as thermal expansion, and pressure and mechanical load deflections that may affect the position of ports 54 relative to gate openings 70.

In one form, the overlap between ports 54 and gate openings 70 may be changed from zero to the maximum allowable overlap permitted by the sizes of ports 54 and gate openings 70. In other embodiments, operation may be limited to some minimum nonzero overlap and some upper limit that is less than the maximum allowable overlap permitted by the sizes of ports 54 and gate openings 70. In some embodiments, the overlap between ports 54 and gate openings 70 may be varied incrementally, whereas in others, it may be varied continuously, e.g., as between some minimum and maximum values. Embodiments employing incremental variation in the overlap may include only two valve positions, e.g., opened/closed or minimum/maximum, or may include more than two valve positions.

Figure 5A:
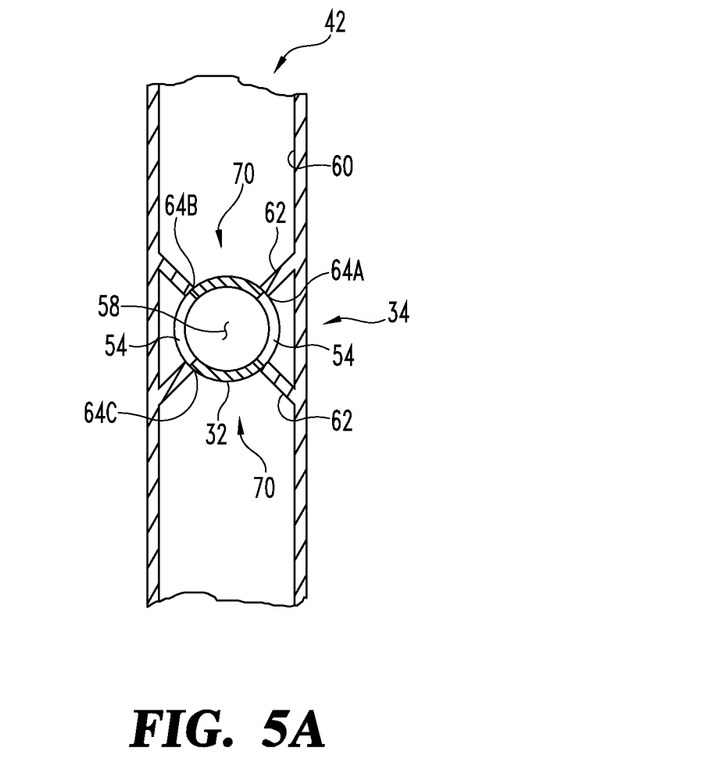
FIGS. 5A and 5B are cross sections through a plenum illustrating some aspects of a non-limiting example of potential operating points of a system for modulating secondary air flow in accordance with an embodiment of the present invention.
Figure 5B:
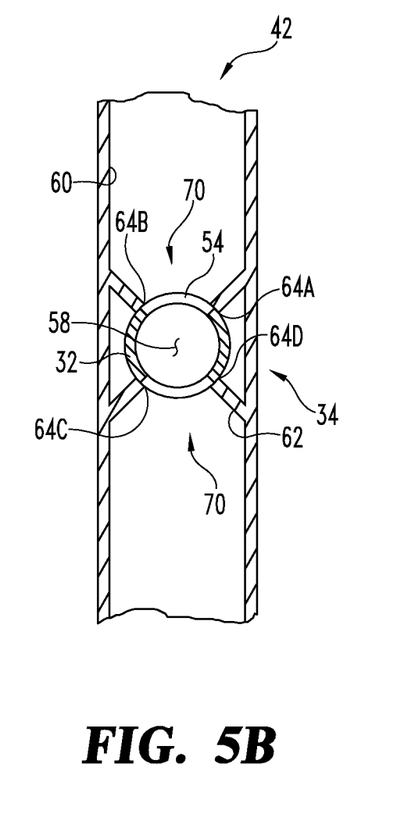

Referring now to FIGS. 5A and 5B, system 26 is depicted with no overlap between ports 54 and gate openings 70 (FIG. 5A) and with a maximum overlap between ports 54 and gate openings 70 (FIG. 5B). In the depiction of FIG. 5A, secondary airflow is inhibited because movable valve member 32 inhibits the flow of pressurized air in plenum 42 from entering passage 56 and discharging through port 58. In the depiction of FIG. 5B, movable valve member 32 is depicted as having been rotated sufficiently to fully overlap gate openings 70, thereby allowing secondary air flow to enter passage 56 via gate openings 70 and ports 54, which is discharged at port 58 of movable valve member 32. It will be understood that the relative sizes of ports 54 and gate openings 70, as well as the sizes of other features set forth herein, are merely illustrative and are non-limiting. Rather, the design parameters for system 26 are selected in accordance with the needs of the particular application.

Embodiments of the present invention include a gas turbine engine, comprising: a compressor; a combustor in fluid communication with the compressor; a turbine in fluid communication with the compressor; and a system for modulating secondary air flow from the compressor, including: a valve shaft; a movable valve member having a first port, a second port and a passage in fluid communication with the first port and the second port, wherein the movable valve member is coupled to the valve shaft and is operative to transmit the secondary air flow through the passage between the first port and the second port; and a stationary valve member having a gate opening positioned adjacent to the first port, wherein the movable valve member and the stationary valve member are structured to yield an overlap of the first port with the gate opening upon a movement of the movable valve member; and wherein the overlap forms a valve flow area that permits the secondary air flow to pass through the gate opening and the first port for discharge through the second port.

In a refinement, the gas turbine engine further includes a main flowpath extending from the compressor to the turbine, wherein the valve shaft is disposed at least partially outside of the main flowpath; and wherein the gate opening is disposed inboard of the main flowpath.

In an additional refinement, the gas turbine engine further includes an engine case and an actuator, wherein the actuator is coupled to the valve shaft and is operative to impart the movement to the valve shaft effective to control the size of the valve flow area, and wherein the actuator is positioned outside of an engine case.

In another refinement, the gate opening is disposed inboard of the engine case.

In yet another refinement, the gas turbine engine further includes a main flowpath extending from the compressor to the turbine, wherein the gate opening is disposed inboard of the main flowpath.

In still another refinement, the movement is a rotation of the valve shaft.

In yet still another refinement, the compressor includes a vane stage having a plurality of airfoils, and wherein at least one of the valve shaft and the movable valve member are disposed at least partially in an airfoil of the plurality of airfoils.

In a further refinement, the compressor includes a vane stage having a plenum in fluid communication with the valve flow area.

In yet a further refinement, the gas turbine engine further a main flowpath extending from the compressor to the turbine, wherein the vane stage includes an opening in fluid communication with both the main flowpath and the plenum.

In still a further refinement, the plenum is disposed inboard of the main flowpath.

Embodiments of the present invention include a gas turbine engine, comprising: a compressor having a compressor case; a combustor in fluid communication with the compressor; a turbine in fluid communication with the compressor; and a system for modulating secondary air flow from the compressor, including: means for providing a valve flow area that permits secondary air flow from the compressor, wherein the means for providing is located inboard of the compressor case; and means for mechanically actuating the means for providing, wherein the means for mechanically actuating is disposed at least partially outside the compressor case.

In a refinement, the gas turbine engine further includes means for collecting the secondary air flow that passes through the valve flow area.

In another refinement, the means for collecting is disposed inboard of a main flowpath of the gas turbine engine.

In yet another refinement, the means for providing includes a rotatable valve member.

Embodiments of the present invention include a vane stage for a gas turbine engine, comprising: an inner band; an outer band; a plurality of airfoils disposed between the inner band and the outer band; and a plenum operative to distribute secondary air flow, wherein the plenum employs a stationary valve member adapted to interface with a movable valve member having a port, wherein the stationary valve member includes a gate opening positioned adjacent to the port, and wherein an overlap of the port with the gate opening forms a valve flow area that permits the secondary air flow to pass through the gate opening and the port.

In a refinement, the plenum has an opening structured to receive at least one of a valve shaft and the movable valve member.

In another refinement, the plenum has another opening structured to receive at least one of the valve shaft and the movable valve member.

In yet another refinement, at least one of the inner band and the outer band include openings in fluid communication with a main flowpath of the gas turbine engine and in fluid communication with the plenum.

In still another refinement, at least one of the airfoils is adapted to receive at least one of a valve shaft coupled to the movable valve member and the movable valve member.

In yet still another refinement, the plenum is located inboard of a main flowpath of the gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a compressor;
   a combustor in fluid communication with the compressor;
   a turbine in fluid communication with the compressor; and
   a system for modulating a secondary air flow from the compressor, including:
      a valve shaft;
      a movable valve member having a first port, a second port, and a discharge port and a passage in fluid communication with the first port, the second port, and the discharge port, wherein the movable valve member is coupled to the valve shaft and is operative to transmit the secondary air flow through the passage between the first port and the discharge port; and
      a stationary valve member having a first gate opening positioned adjacent to the first port and a second gate opening positioned adjacent the second port,
      wherein the movable valve member and the stationary valve member are structured to inhibit or cause a first overlap of the first port with the first gate opening and to inhibit or cause a second overlap of the second port with the second gate opening upon a movement of the movable valve member; and wherein the first overlap forms a first valve flow area that permits the secondary air flow to pass through the first gate opening and the first port for discharge through the discharge port; and
      wherein the compressor includes a vane stage having a plenum, radially offset from a main flowpath of the compressor and in fluid communication with the first valve flow area and operative to distribute the secondary air flow, and an opening in the vane stage in fluid communication with the plenum, wherein the movable valve member and the stationary valve member are configured to allow the secondary air flow to pass through the first port at one end of the movable valve member and to discharge the secondary air flow at the discharge port radially offset from the one end.

2. The gas turbine engine of claim 1, further comprising the main flowpath extending from the compressor to the turbine, wherein the valve shaft is disposed at least partially outside of the main flowpath; and wherein the first gate opening is disposed inboard of the main flowpath.

3. The gas turbine engine of claim 1, further comprising an engine case and an actuator, wherein the actuator is coupled to the valve shaft and is operative to impart the movement to the valve shaft effective to control a size of the first valve flow area, and wherein the actuator is positioned outside of an engine case.

4. The gas turbine engine of claim 3, wherein the first gate opening is disposed inboard of the engine case.

5. The gas turbine engine of claim 4, further comprising the main flowpath extending from the compressor to the turbine, wherein the first gate opening is disposed inboard of the main flowpath.

6. The gas turbine engine of claim 1, wherein the movement is a rotation of the valve shaft.

7. The gas turbine engine of claim 1, wherein the compressor includes the vane stage having a plurality of airfoils, and wherein at least one of the valve shaft and the movable valve member are disposed at least partially in an airfoil of the plurality of airfoils.

8. The gas turbine engine of claim 1, further comprising the main flow path extending from the compressor to the turbine, wherein the vane stage includes an opening in fluid communication with both the main flow path and the plenum.

9. The gas turbine engine of claim 8, wherein the plenum is disposed inboard of the main flow path.

10. A gas turbine engine, comprising:
    a compressor having a compressor case;
    a combustor in fluid communication with the compressor;
    a turbine in fluid communication with the compressor; and
    a system for modulating a secondary air flow from the compressor, including:
       a rotatable valve member and a stationary valve member, the rotatable valve member having a first port and a discharge port, and a passage in fluid communication with the first port and the discharge port, wherein the rotatable valve member and the stationary valve member are configured to provide a first valve flow area and a second valve flow area that together permit the secondary air flow from the compressor, wherein the rotatable valve member is located inboard of the compressor case; and
       an actuator for mechanically actuating the rotatable valve member, wherein the actuator is disposed at least partially outside the compressor case;
       wherein the compressor includes a vane stage having a plenum, radially offset from a main flowpath in the compressor and in fluid communication with the first valve flow area and operative to distribute the secondary air flow, and an opening in the vane stage in fluid communication with the plenum, wherein the rotatable valve member and the stationary valve member are configured to allow the secondary air flow to pass through the first port at one end of the rotatable valve member and to discharge the secondary air flow at the discharge port radially offset from the one end.

11. The gas turbine engine of claim 10, wherein the plenum is disposed inboard of the main flow path of the gas turbine engine.

12. A vane stage for a gas turbine engine, comprising:
an inner band;
an outer band;
a main flow path of the gas turbine engine disposed between the inner band and the outer band;
a plurality of airfoils disposed in the main flow path between the inner band and the outer band; and
a plenum radially offset from the main flow path within the inner band and operative to distribute a secondary air flow, wherein the plenum employs a stationary valve member adapted to interface with a movable valve member having a port, and
an opening in the inner band in fluid communication with the plenum, wherein the stationary valve member and the movable valve member are configured to allow the secondary air flow to pass through the port at one end of the movable valve member and to discharge the secondary air flow at another end of the movable valve member radially offset from the one end;
wherein the stationary valve member includes a gate opening positioned adjacent to the port, and wherein an overlap of the port with the gate opening forms a valve flow area that permits the secondary air flow to pass through the gate opening and the port.

13. The vane stage of claim 12, wherein the plenum has an opening structured to receive at least one of a valve shaft and the movable valve member.

14. The vane stage of claim 13, wherein the plenum has another opening structured to receive at least one of the valve shaft and the movable valve member.

15. The vane stage of claim 12, wherein at least one of the inner band and the outer band include openings in fluid communication with the main flow path of the gas turbine engine and in fluid communication with the plenum.

16. The vane stage of claim 12, wherein at least one of the plurality of airfoils is adapted to receive at least one of a valve shaft coupled to the movable valve member and the movable valve member.

17. The vane stage of claim 16, wherein the plenum is located inboard of the main flow path of the gas turbine engine.

* * * * *